United States Patent
Delineau et al.

(10) Patent No.: US 11,248,111 B2
(45) Date of Patent: *Feb. 15, 2022

(54) CONJUNCTION DEVICE SUCH AS A CABLE AND POLYMER COMPOSITION FOR PREPARING SAME

(71) Applicant: LEONI KABEL GMBH, Roth (DE)

(72) Inventors: Lydie Delineau, Zunzgen (CH); Martin Egli, Bad Schinznach (CH); Melanie Eggert, Aarau (CH); Henrich Krump, Trencin (SK); Vladimir Kwapulinsky, Považská Bystrica (SK)

(73) Assignee: LEONI KABEL GMBH, Nuremberg (DE)

( * ) Notice: Subject to any disclaimer, the term of this patent is extended or adjusted under 35 U.S.C. 154(b) by 331 days.

This patent is subject to a terminal disclaimer.

(21) Appl. No.: 16/330,622

(22) PCT Filed: Sep. 9, 2016

(86) PCT No.: PCT/US2016/071355
§ 371 (c)(1),
(2) Date: Mar. 5, 2019

(87) PCT Pub. No.: WO2018/046096
PCT Pub. Date: Mar. 15, 2018

(65) Prior Publication Data
US 2020/0385552 A1 Dec. 10, 2020

(51) Int. Cl.
*C08L 23/06* (2006.01)
*H01B 3/44* (2006.01)
*H01B 7/295* (2006.01)

(52) U.S. Cl.
CPC .............. *C08L 23/06* (2013.01); *H01B 3/441* (2013.01); *H01B 7/295* (2013.01); *C08L 2201/02* (2013.01); *C08L 2203/20* (2013.01); *C08L 2205/025* (2013.01); *C08L 2205/03* (2013.01); *C08L 2207/064* (2013.01)

(58) Field of Classification Search
None
See application file for complete search history.

(56) References Cited

U.S. PATENT DOCUMENTS

| | | | |
|---|---|---|---|
| 6,475,633 B1 | 11/2002 | Robert et al. | |
| 9,321,912 B2 | 4/2016 | Tai et al. | |
| 2009/0090536 A1* | 4/2009 | Park | H01B 7/295 174/113 C |
| 2011/0240335 A1* | 10/2011 | Grizante Redondo | C08L 23/0815 174/116 |
| 2012/0261163 A1* | 10/2012 | Tai | C08L 23/10 174/136 |
| 2017/0004906 A1* | 1/2017 | Tanaka | H01B 3/441 |
| 2018/0371221 A1* | 12/2018 | Yanagawa | H01B 7/295 |

FOREIGN PATENT DOCUMENTS

| | | |
|---|---|---|
| CN | 102108148 A | 6/2011 |
| CN | 103113705 A | 5/2013 |
| CN | 103483673 A | 1/2014 |
| CN | 103965541 A | 8/2014 |
| CN | 104262883 A | 1/2015 |
| CN | 104530545 A | 4/2015 |
| CN | 104797649 A | 7/2015 |
| CN | 104804441 A | 7/2015 |
| DE | 3633056 A1 | 4/1988 |
| DE | 69619270 T2 | 9/2002 |
| EP | 1102282 A1 | 5/2001 |
| EP | 1416502 A1 | 5/2004 |
| EP | 1664171 B1 | 10/2007 |
| WO | 00778860 | 12/2000 |
| WO | 0226879 | 4/2002 |
| WO | 03082966 | 10/2003 |
| WO | 2004044049 A2 | 5/2004 |
| WO | 2005047388 A1 | 5/2005 |
| WO | 2007032573 | 3/2007 |
| WO | 2007044159 | 4/2007 |
| WO | 2007090265 | 8/2007 |
| WO | 2008014597 | 2/2008 |
| WO | 2008083975 | 7/2008 |
| WO | 2010015876 A1 | 2/2010 |
| WO | 2010024602 | 3/2010 |
| WO | 2010033396 | 3/2010 |
| WO | 2011003947 | 1/2011 |
| WO | 2011039474 A1 | 4/2011 |
| WO | WO 2011/129657 | * 10/2011 |

(Continued)

OTHER PUBLICATIONS

Machine translation of Noon et al. WO 2011/129657 (Year: 2011).*
Datasheet for Engage 8842 p. 1-2 (Year: 2011).*
Database WPI Week 201162 Thomson Scientific, London GB XP-002769866—Orignal Dow Advanced Compounds Shanghai—Jun. 29, 2011.
ENGAGE Polyolefin Elastomers—Halogen Free Flame Retardant Cable Formulations published Oct. 2006.
ENGAGE Polyolefin Elastomers—Product Selection Guide—, Dow Elastomers published Aug. 2015.
ENGAGE 8842 The Dow Chemical Company—Polyolefin Elastomer, ENTEC, Dec. 8, 2015.

(Continued)

*Primary Examiner* — Robert T Butcher
(74) *Attorney, Agent, or Firm* — Tarolli, Sundheim, Covell & Tummino LLP

(57) ABSTRACT

The invention relates to conjunction devices and polymer compositions used for preparing the conjunction devices. The conjunction devices comprise one or more elements including a static/moving current medium or communication medium; and a halogen-free polymer composition surrounding the element(s). The polymer composition includes a linear very low density polyethylene (VLDPE) composition and one or more polyolefin-elastomers. In addition, the polymer composition includes a flame retardant filler.

17 Claims, No Drawings

(56) References Cited

FOREIGN PATENT DOCUMENTS

| WO | 2012168746 A1 | 12/2012 |
| WO | 2013030795 A1 | 3/2013 |
| WO | 2014052017 | 4/2014 |
| WO | 2014140383 A1 | 9/2014 |
| WO | 2014153655 A1 | 10/2014 |
| WO | 2015155258 A1 | 10/2015 |

OTHER PUBLICATIONS

ENGAGE 8452 Polyolefin Elastomer, Technical Information—Dow, Sep. 7, 2011.
ENGAGE 8411 The Dow Chemical Company—Polyolefin Elastomer, ENTEC, Feb. 25, 2016.
ENGAGE 8003 The Dow Chemical Company—Polyolefin Elastomer, ENTEC, Feb. 25, 2016.
Clearflex® CL D0 Very Low Density Polyethylene, Technical Data Sheet, Eni Polimeri Europa, Mar. 2006.
Clearflex® MQ F0 VLDPE Very Low Density Polyethylene, Technical Data Seet, Eni versalis, Nov. 2014.
Dynasylan® VTEO, Evonik Industries, product information.
Phenolic Antioxidants, Songwon, product information.
Queo 0203 octene-1 Plastomer, Data Sheet, Borealis, May 2013.
Queo 8201 octene-1 Plastomer, Data Sheet, Borealis, May 2015.
QueoTM 1007 ctene-1 Plastomer, Data Sheet, Borealis, May 2013.
Martinal OL-104 LEO / OL-107 LEO Albemarle, Oct. 2007.
Dynasylan® VTMO Vinyltrimethoxysilane, Sivento Silanes, Degussa Jan. 2005.
Wahit et al "Ethylene-octene copolymer (POE) toughened . . . " eXPRESS Polymer Letters vol. 3 No. 5 (2009), 309-319.

* cited by examiner

CONJUNCTION DEVICE SUCH AS A CABLE AND POLYMER COMPOSITION FOR PREPARING SAME

CROSS REFERENCES TO RELATED APPLICATIONS

This application filed under 35 U.S.C § 371 is a national phase application of International Application Serial Number PCT/US2016/071355 filed Sep. 9, 2016.

The invention relates to conjunction devices as defined in the claims and polymer compositions as defined in the claims used for preparing the conjunction devices. Conjunction devices which are halogen-free but have flame retardance properties are used in various applications such as in applications in the vicinity of inflammable goods or in applications where high safety standards have to be met.

The challenges in the development of conjunction devices are related to the various industrial requirements which have to be met. These industrial requirements concern flame retardance properties, resistance to scratches, low friction, and penetration of sharp objects (mechanical protection), elongation at break, strength at break, flexibility, stripping force, low friction, and resistance to scratches. In order to improve one or the other property, an infinite number of polymer materials and polymer additives are available. However, while it may be possible to improve one or the other parameter by routine development, changing the polymer composition in this course results in the deterioration of at least one other parameter. Since it is not predictable how the above parameters will vary, if the polymer composition is changed, many approaches have been tried to fulfill the industrial requirements for conjunction devices.

BACKGROUND PRIOR ART

EP1102282 A1 discloses devices surrounded by an inner and an outer layer. The outer layer provides chemical resistance and abrasivity ([0011]) and the inner layer provides flame retardancy and high elongation and tensile strength ([0011]). One example of an inner layer is Rezeptur 7 in Table 1 of page 6. The layers are described as providing a high elongation. In order to provide a desired adhesiveness between the layers, the layers can comprise block copolymers. However, as shown in Example 2 herein, block copolymers do not provide the highest elongation at break. Furthermore, EP1102282 A1 does not teach the relevance of the type of polyolefines regarding the elongation properties.

Compositions comprising polyolefin elastomers (POE) in combination with a high density polyethylene (HDPE) and a polyethylene having a density of below 0.910 g/cm$^3$ as well as a flame retardant, a coupling agent, and a stabilizer are known in the art. Using a combination of HDPE and VLDPE (very low density polyethylene) is known for achieving good elongation properties. However, the use of HDPE is neither required nor desirable in the context of the present invention.

Other known polymer compositions may provide an elongation of only up to about 300%. Such compositions may include an ultra-high molecular weight polysiloxane.

DE3633056 A1 teaches that VLDPEs increase the resistance to thermal distortion (claim 5). It neither discloses nor suggests using a combination of the particular VLDPE and particular polyolefin-elastomer of the present invention for providing a polymer composition having a high content of flame retardant filler.

WO 2010015876 A1, WO 2013030795 A1, and WO 2007032573 A1 disclose compositions which have an elongation at break below only 200%.

WO 2002026879 A1 discloses a halogen-free polymeric composition including: (a) at least two metallocene catalysed olefin polymers and/or copolymers wherein at least one of the olefin polymers and/or copolymers is elastomeric; and (b) an effective amount of at least one filler which is capable of providing the polymeric composition with flame retardant properties substantially similar to that of plasticised PVC (see claim 1). The composition includes at least about 30 PHR of at least one metallocene catalysed polyolefin elastomer (POE). For more flexible compositions, even higher POE contents are suggested. The present invention does not require such high POE contents in order to provide the desired elongation properties.

WO 2008014597 A1 and WO 2010024602 A2 disclose compositions having an elongation of up to about 800%. However, these compositions do not contain high levels of fillers which are flame retardants.

It is therefore an object of the present invention to provide conjunction devices having good long term mechanical stability and flame retardancy, in particular low flammability, good resistance to pressure at high temperatures (mechanical protection), high elongation at break, good dimensional stability, high strength at break, and high flexibility. Other properties which may be good, relate to the waviness (which is related to the intensity of the spiral appearance of a cable surface predefined by the twisted cores), stripping force for removal of the polymer composition from the elements, low friction, and resistance to scratches.

SUMMARY OF THE INVENTION

The invention relates to conjunction devices comprising:
(i) one or more elements including a medium with static/moving electrical current or communication medium; and
(ii) a halogen-free polymer composition or compound surrounding the element(s), wherein said polymer composition is obtainable or obtained by compounding and extrusion of at least the following components onto (i):
(a) 24-32 wt.-% of a linear very low density polyethylene (VLDPE) composition having a density in the range from 0.85 g/cm$^3$ to 0.93 g/cm$^3$, as measured according to ISO 1183, and having a melting point of above 110° C. as determined by differential scanning calorimetry;
(b) 8-16 wt.-% of one or more polyolefin-elastomers, wherein the polyolefin-elastomer(s) is/are (an) ultra-low density random ethylene-octene copolymer(s) having
a glass transition temperature of below −50° C. as determined by differential scanning calorimetry, and
a melting point of below 40° C. as determined by differential scanning calorimetry; and
(c) 56-65 wt.-% of a flame retardant filler, which is a hydrated metal-based filler.

The invention further relates to a polymer composition obtainable or obtained by compounding at least the components (a), (b) and (c) as defined above.

Conjunction devices comprising elements surrounded by a polymer composition have to fulfill various demands. First of all, it must be possible to prepare the devices in an economic manner by using standard manufacturing devices such as extruders. Therefore, the polymer composition has to be suitable for being applied to and/or onto the inner elements by way of HFFR (Halogen-Free Flame Retardant) extrusion.

During use, conjunction devices are subjected to bending movements and pull force conditions for a very high number of times such as several hundreds of bending movements and pull force conditions over the lifetime of said devices. Under such extreme conditions, polymers used as the material for surrounding the structure of the conjunction devices can break. In order to avoid breaking of the polymer coat, the flexibility of the polymers is increased. However, several other properties also have to be fulfilled by the conjunction devices, and increasing the flexibility of the polymers can result in deterioration of other properties (cf. experimental section hereinafter). For example, flexibility of the polymer can be increased by reducing the content of flame retardant filler, resulting in reduced flame retardancy. At the same time, the degree of indentation in the hot pressure test may increase, since the increased flexibility reduces the dimensional stability.

Further difficulties arise if halogen-free flame retardants are used. Avoiding halogens is desirable, because halogenated flame retardants have many drawbacks, since they partially decompose during processing of the polymer, or if the polymer catches fire during use, giving rise to halogenated fumes that are toxic and corrosive. However, to impart sufficient flame retardancy, high levels of halogen-free flame retardants/fillers have to be used. Such high levels of filler lead to a reduction in processability and in mechanical and elastic properties of the resulting polymer composition, in particular as regards impact resistance, elongation, flexibility and stress at break.

The various parameters which have to be met by conjunction devices are preset by the industry on the basis of various standards, which are mentioned herein.

For example, the conjunction devices have to comply with the hot pressure test in order to have good mechanical resistance to higher temperatures, i.e., have to provide correct values under the respective test conditions (<50%, ENSO 363) in accordance with IEC 60811-508 (4 hrs @80° C.). Although the single/pure components of polymer composition, such as the polyolefin elastomers, may fail the hot pressure test when tested on their own, the extruded multicomponent polymer composition may pass the hot pressure test. Accordingly, in order to meet the hot pressure test, it is not possible to simply select starting materials which pass the hot pressure test, expecting that this property will be retained in the multicomponent extruded polymer composition.

The main challenge, however, is the alternate bending test or also known from persons skilled in the art as "Two pulley flexing test" (EN 50396) which is cost and time consuming. A test specimen has to be subjected to 30000 test cycles. For performing the test, a fully industrially produced prototype is needed. Therefore, it is rather a validation test, after the final development, but not a test which can be used for optimizing the polymer composition.

The most important parameters which define the suitability and quality of a conjunction device are: Flame retardancy which complies with the test for vertical flame propagation according to EN 60332-1-2 (which is cost and time consuming because the test is executed on the final product as well as on the polymer composition), good resistance to pressure at high temperatures (mechanical protection) (hot pressure test, ISO 6722), high elongation at break (IEC 60811-501), good dimensional stability (hot pressure test, ISO 6722), high strength at break (IEC 60811-501), and high flexibility (alternate bending test, EN 50396). Other properties which may be good relate to the waviness, low friction, resistance to scratches, and stripping force.

Since an infinite number of polymers, monomers and polymer additives are available, it is impossible to randomly prepare and test polymers regarding their parameters. Furthermore, as explained above, it is not possible to optimize one parameter after another, since changing the polymer composition influences all parameters positively or negatively at the same time. In other words, it is difficult to find the "sweet spot", where all parameters are balanced at an acceptable or best level. It is not even possible to determine in advance, whether a particular combination of starting materials is suitable for providing an extruded polymer composition which meets all industrial standards.

Therefore, it has been unexpectedly found that the polymer compositions of the present invention represent such a "sweet spot", where all or essentially all above industrial requirements may be complied with. The polymer compositions are characterized by a combination of a specific linear very low density polyethylene (VLDPE) composition and a specific ultra-low density random ethylene-octene copolymer (polyolefin-elastomer) at high levels of HFFR filler. The "sweet spot" is defined by the specific combination of materials and the narrowly defined window for the amounts thereof. As demonstrated by the examples herein, working outside this "sweet spot" results in deterioration of one or more parameters.

As seems to be suggested by the examples, a high elongation at break and good performance in the alternate bending test can even be obtained when using very high levels of HFFR fillers. The use of a random ethylene-octene copolymer seems to be superior to the use of a block octene copolymer regarding elongation at break. A comparison between compositions 3 and 4 (cf. examples 3 and 4) seems to suggest that the use of a propylene-based elastomer does not provide a very high elongation as is obtained when using a random ethylene-octene copolymer as the polyolefin-elastomer. Likewise, the use of an ethylene vinyl acetate copolymer instead of the specific VLDPEs does not allow providing a high elongation at break and does not allow passing the hot pressure test (cf. example 5). Example 6 seems to suggest that the use of a random ethylene-octene copolymer is superior to the use of an α-olefin copolymer regarding elongation at break. Example 7 seems to suggest that a low amount of VLDPEs in combination with an amorphous propylene-ethylene copolymer, in addition to a block octene copolymer as the polyolefin-elastomer, does not allow passing the hot pressure test. Example 8 seems to suggest that the use of a higher amount of POE but lower amount of VLPDEs does not allow passing the hot pressure test.

Thus, the invention relates to conjunction devices and polymer compositions for preparing same as defined in the claims, wherein said conjunction devices and polymer compositions allow complying with all or essentially all industrial standards which are referred to herein.

DETAILED DESCRIPTION

The invention relates to the following items:
1. Conjunction device comprising:
(i) one or more elements including a medium with static/moving charge/current (or electric charge) or communication medium; and
(ii) a halogen-free polymer composition surrounding the element(s), wherein said polymer composition is obtainable or obtained by compounding and extrusion of at least the following components onto (i):

(a) 24-32 wt.-% of a linear very low density polyethylene (VLDPE) composition having a density in the range from 0.85 g/cm$^3$ to 0.93 g/cm$^3$, as measured according to ISO 1183, and having a melting point of above 110° C., e.g., related to the differential scanning calorimetry (DSC) measurement;

(b) 8-16 wt.-% of one or more polyolefin-elastomers, wherein the polyolefin-elastomer(s) is/are (an) ultra-low density random ethylene-octene copolymer(s) having a glass transition temperature of below −50° C. as determined in the polymer composition or in pure form, wherein the determination of the melting point will be provided, e.g., from the DSC measurement, and/or a melting point of below 40° C. as determined in the polymer composition or in pure form, wherein the determination of the melting point will be provided on basis of, e.g., the DSC measurement, wherein, by way of example, Engage® 8842 of Dow has a very low melting point of 38° C.; and (c) 55-65 wt.-% of flame retardant filler, which is a mineral hydroxide/hydrated metal-based filler.

2. The conjunction device according to item 1, wherein the polymer composition further comprises: (d) 0.1-3.0 wt.-% of an antioxidant; and (e) 0.5-2.5 wt.-% of a coupling agent composition.

3. The conjunction device according to item 1 or 2, wherein the polymer composition has (aa) an elongation at break in the range from 300% to 500%, preferably 400% to 500%, or 350% to 450%, as measured by IEC 60811-501, preferably measured by using the conjunction device without the one or more elements, and/or (bb) a strength at break in the range from 7.5 MPa to 15.0 MPa, or 8.0 MPa to 10.0 MPa, preferably before ageing, as measured by IEC 60811-501 and as required by DIN EN 50363-8. During ageing, the samples are placed into an oven for 7 days at 80° C., then put into a desiccator and then tested. The deviation in elongation and tensile strength is preferably not bigger than ±20%. Unless otherwise stated, all values referred to herein are measured without ageing.

4. The conjunction device according to any preceding item, wherein the linear very low density polyethylene composition is/comprises a mixture of two different types of linear very low density polyethylene compositions, preferably a mixture of 20-26 wt.-% of a first composition, preferably having a density in the range from 0.85 g/cm$^3$ to 0.95 g/cm$^3$, preferably of about 0.9 g/cm$^3$, as measured according to ISO 1183, and 1-7 wt.-% of a second composition, preferably having a density in the range from 0.85 g/cm$^3$ to 0.95 g/cm$^3$, preferably of about 0.9 g/cm$^3$, as measured according to ISO 1183. Preferably, the VLDPE, which is present in a higher amount, has a higher melt flow rate compared with the other VLDPE. Preferably, the VLDPE being present in an amount of 1-7 wt.-% has a melt flow index of 2-5, as measured according to ASTM1238 (190° C./2.16 kg; g/10 min), while the VLDPE being present in an amount of 20-26 wt.-% has a melt flow index of 8-15, as measured according to ASTM1238 (190° C./2.16 kg; g/10').

5. The conjunction device according to any preceding item, wherein the linear very low density polyethylene composition has a density in the range from 0.85 g/cm$^3$ to 0.92 g/cm$^3$, preferably in the range from 0.85 g/cm$^3$ to 0.90 g/cm$^3$, as measured according to 1501183.

6. The conjunction device according to any preceding item, wherein the polyolefin-elastomer has a density in the range from 0.80 g/cm$^3$ to 0.90 g/cm$^3$, preferably of about 0.859 g/cm$^3$, as measured according to ASTM D792.

7. The conjunction device according to any preceding item, wherein the polyolefin-elastomer (composition) has an elongation at break of at least 1000%, further preferred at least 1100%, most preferably about 1200%, as measured by ASTMD638.

8. The conjunction device according to any preceding item, wherein the polyolefin-elastomer has a value of ShoreD hardness of less than 20, as measured by ASTM D2240 (compression molded sample, wherein a sample of the polyolefin-elastomer is molded into a plate). The value of ShoreD hardness of the conjunction device/polymer composition preferably is 32-38.

9. The conjunction device according to any preceding item, wherein the polymer composition is applied by hot-melt extrusion at a temperature in the range from 100° C. to 175° C., preferably 100-170° C.

10. The conjunction device according to any preceding item, wherein the flame retardant filler is fine precipitated hydrated metal-based filler, e.g., aluminum hydroxide or magnesium hydroxide, preferably having about 99.4% purity. One example of such filler is Martinal® OL-104 LEO.

11. The conjunction device according to any preceding item, wherein the coupling agent composition is a mixture of vinyltriethoxysilane and 1,1-di(tert-butylperoxy)-3,3,5-trimethylcyclohexane.

12. The conjunction device according to any preceding item, wherein the antioxidant is a phenolic antioxidant, preferably tetrakis[methylene-3-(3,5-di-tert-butyl-4-hydroxyphenyl)propionate] methane.

13. The conjunction device according to any preceding item comprising from 1 to 8 elements, each having diameters of up to 4.0 mm, such as diameters from 0.5 to 4.0 mm, and preferably having from 2 to 5 elements. The static/moving current media or communication media of the elements can be a metal wire, wherein the wire can be one piece of metal, preferably the wire is further stranded. The wire can be surrounded by a polymer layer to form the element.

14. The conjunction device according to any preceding item, wherein the polymer composition does not contain a plasticizer.

15. The conjunction device according to any preceding item, wherein the polymer composition does not contain a high density polyethylene homopolymer having a density of 0.94 g/cm$^3$ or higher, preferably not containing a high density polyethylene homopolymer having a density of 0.92 g/cm$^3$ or higher.

16. The conjunction device according to any preceding item, wherein the polymer composition does not contain a polysiloxane.

17. The conjunction device according to any preceding item, wherein the polymer composition surrounds the elements to provide a sheath for mechanical protection of the elements.

18. The conjunction device according to any preceding item, wherein, the glass transition temperature of the polyolefin-elastomer/ultra-low density random ethylene-octene copolymer is −58° C.

19. The conjunction device according to any preceding item, wherein the polymer composition is not UV cross-linked.

20. The conjunction device according to any preceding item, having an MFI of at least 9 g/10 min, as measured according to EN ISO 1133, under the conditions at 150° C. and the load of 21.6 kg.

21. The conjunction device according to any preceding item, wherein the density of the polyolefin-elastomer/ultra-low density random ethylene-octene copolymer is in the range from 0.80 g/cm$^3$ to 0.90 g/cm$^3$, as measured according to ISO 1183.

22. The conjunction device according to any preceding item, wherein the polymer composition has a value of ShoreD hardness of 32-38.

23. The conjunction device according to any preceding item, wherein the linear very low density polyethylene (VLDPE) composition having a melting point above 110° C., preferably has a melting point which is below 120° C. measured and/or determined by the method of DSC measurement.

24. The conjunction device according to any preceding item, wherein the linear very low density polyethylene (VLDPE) composition has a Vicat temperature (Vicat softening temperature) of above 50° C., for example, measured according to the ASTM D1525 method.

25. The conjunction device according to any preceding item, which passes the alternate bending test (EN 50396).

26. Polymer composition obtainable or obtained by compounding at least the components (a)-(c), preferably also components (d) and (e) as described herein.

In the context of the present invention, the "conjunction device" can be an elongated device for conjunction and/or connection of two devices for transferring electrical charges and/or information such as for power transmission or telecommunications. For example, the "conjunction device" can be a cable. In such a "conjunction device", the elements (which are surrounded by the polymer composition) can each include an electric conductor as the static/moving current medium or communication medium. The electric conductor is optionally itself surrounded by a shielding or sheathing, in particular a polymer composition/coating, thereby forming the element. The electrical conductor can be a wire, preferably comprising or consisting of one or more, e.g., 52, metal strands (e.g., copper strands), wherein the wire is optionally itself surrounded by a shielding or sheathing, thereby forming the element. The cable can, e.g., be used as low voltage cable such as for use in vacuum cleaner applications.

In the context of the present invention, the weight percentages indicated for the components of the polymer composition are indicated as weight percentages based on the total weight of the polymer composition.

Linear very low density polyethylenes (VLDPEs) as used herein are homopolymers.

In the context of the present invention, the "linear very low density polyethylene (VLDPE)", "ultra-low density random ethylene-octene copolymer (polyolefin-elastomer)" and any other polymer component can be used in the form of commercially available products. Since these products may contain minor amounts of additives (e.g., antioxidants), in addition to, e.g., pure polyethylene or ethylene-octene copolymer, the aforementioned terms, e.g., "linear very low density polyethylene (VLDPE)", and "ultra-low density random ethylene-octene copolymer (polyolefin-elastomer)", encompass compositions comprising such minor amounts of additives, e.g., amounts of additives of below 1.0 wt.-% or below 0.5 wt.-%. It can reasonably be expected that such minor amounts of additives do not have a significant impact on the final properties of the polymer composition.

In the context of the present invention, the parameters defined herein, in particular in the claims, can either be determined by testing the conjunction device, the polymer composition, or the single/pure components of the polymer composition. A person skilled in the art can determine the most feasible approach. For example, if the density of a VLDPE, which is present in the polymer composition of a conjunction device, is not known, the VLDPE may be extracted from the polymer composition and analyzed. If the glass transition temperature or melting point of a polyolefin-elastomer, which is present in the polymer composition of a conjunction device, is unknown, these parameters can be determined via DSC methods on the polymer composition.

As disclosed above, the invention relates to a conjunction device comprising or consisting of components (i) and (ii). The conjunction device can be configured and can be used for connecting two devices for exchange of charges/information between the devices.

Component (i) is one or more elements including a static/moving charge medium or communication medium. The elements can have an elongated form with two ends in order to, e.g., each have a length of up to several kilometers. The elongated elements are aligned and are surrounded by component (ii). Furthermore, the static/moving current medium or communication medium of each of the elements can itself be surrounded by a coat, e.g., polymer coat/composition, which provides a shielding or sheathing. The one or more optionally surrounded static/moving current media or communication media together form component (i). Component (ii) mechanically protects component (i). During use of the conjunction device, components (i) and (ii) may be subjected to many bending movements and pull force. As explained above, the conjunction devices disclosed herein may have sufficient flexibility to avoid breaking thereof even after a very long period of use (determined by the alternate bending test).

Component (ii) is a halogen-free polymer composition/component surrounding the element(s), i.e., component (i). It is not excluded, but less preferred, that there are additional coatings which either surround component (ii) or which are between components (i) and (ii).

The polymer composition is obtainable or obtained by compounding, preferably by HFFR compounding, of at least the components (a), (b) and (c).

Component (a) represents 24-32 wt.-%, preferably 26-30 wt.-%, of a linear very low density polyethylene (VLDPE) composition having a density in the range from 0.85 g/cm$^3$ to 0.93 g/cm$^3$, as measured according to ISO 1183, and having a melting point of above 110° C. as determined by differential scanning calorimetry. Such commercially available polyethylenes are, e.g., Clearflex® MQF0 of Versalis and Clearflex® CLD0 of Polimeri Europa.

One embodiment is 23-25.5% of a first linear very low density polyethylene composition, 4.0-5.5% of a second linear very low density polyethylene composition and 12.5-14% of one polyolefin-elastomers with, e.g., 56-58%, e.g., 56%, 57% or 58% flame retardant filler, e.g., hydrated metal-based filler/aluminum hydroxide/magnesium hydroxide, and optional components as defined in items 1 and 2 adding up to 100% herein.

One further embodiment is 23-25.5% Clearflex® MQF0, 4.0-5.5% Clearflex® CLD0 and 12.5-14.0% Engage 8842 with, e.g., 56-58%, e.g., 56%, 57% or 58% flame retardant filler, e.g., hydrated metal-based filler/aluminum hydroxide/magnesium hydroxide, and optional components as defined in items 1 and 2 adding up to 100% herein.

The linear very low density polyethylene (VLDPE) composition having a melting point above 110° C., e.g., related to the differential scanning calorimetry (DSC) measurement, preferably has a melting point which is below 120° C. as, e.g., also determined by differential scanning calorimetry (DSC).

The linear very low density polyethylene (VLDPE) composition can have a Vicat temperature (Vicat softening temperature) of above 50° C. for example, measured according to the ASTM D1525 method.

Component (b) represents 8-16 wt.-%, preferably 10-16 wt.-%, or 12-14 wt.-% of a polyolefin-elastomer or one or more polyolefin-elastomers, which is an ultra-low density random ethylene-octane copolymer having a glass transition temperature of below −50° C. as determined by differential scanning calorimetry, and a melting point of below 60° C. or below 50° C., preferably below 40° C., as determined by differential scanning calorimetry. Such commercially available polyolefin-elastomers are Engage® 8842, Engage® 8180, Engage® 8130, and Engage® 8150 of Dow.

Component (c) represents 55-65 wt.-% of flame retardant filler, which is a mineral hydroxide/hydrated metal-based filler. Preferably, the polymer composition does not contain further polyethylene components and/or further polyolefin-elastomers.

Compounding of the polymer composition can be performed by mixing the components in a molten state, e.g. in an Intermixer. A device which can suitably be used for extrusion in this context is an extruder, e.g., a twin screw extruder, single screw kneading extruder.

The flame retardant filler or fillers used in the present invention are halogen free. According to the present invention, mineral hydroxides, i.e., mineral fillers which are hydrated oxides can be used. For example, aluminum or magnesium hydroxides, can be used. When exposed to high temperatures, the mineral fillers decompose through endothermic reaction and release large quantities of water, so as to stop flame propagation. The flame retardant filler is preferably aluminum hydroxide, preferably is fine precipitated aluminum hydroxide of about 99.4% purity. One example of such filler is Martinal® OL-104 LEO of Albemarle.

Preferably, the flame retardant filler is used in an amount of 55-65 wt.-%, preferably 55-58%, or 60-65° wt.-%. In one embodiment, a combination of Clearflex MQF0, Clearflex CLD0 and Engage® 8842 is used.

The polymer composition can further comprise (d): 0.1-3.0 wt.-% of an antioxidant; and (e): 0.5-2.5 wt.-% of a coupling agent composition.

Preferably, the polymer composition has (aa) an elongation at break in the range from 300% to 500%, preferably 350% to 500%, or 350% to 450%, as measured by IEC 60811-501, preferably before ageing and preferably by using the conjunction device without the (inner) elements, in particular a conjunction device in the form of a hollow cable with removed conductors and tested according to EN 50363-8, and/or, (bb) a strength at break in the range from 7.5 MPa to 15.0 MPa, as measured by IEC 60811-501.

The linear very low density polyethylene composition can comprises a mixture of two different types of linear very low density polyethylene compositions, preferably a mixture of 20-26 wt.-% of a first composition having a density in the range from 0.85 g/cm$^3$ to 0.95 g/cm$^3$, preferably of about 0.90 g/cm$^3$, as measured according to ISO 1183, and 1-7 wt.-% of a second composition having a density in the range from 0.85 g/cm$^3$ to 0.95 g/cm$^3$, preferably of about 0.90 g/cm$^3$, as measured according to ISO 1183.

The linear very low density polyethylene composition can have a density in the range from 0.85 g/cm$^3$ to 0.92 g/cm$^3$, preferably in the range from 0.85 g/cm$^3$ to 0.90 g/cm$^3$, as measured according to ISO 1183.

The polyolefin-elastomer can have a density in the range from 0.80 g/cm$^3$ to 0.90 g/cm$^3$, preferably of about 0.86 g/cm$^3$, as measured according to ASTM D792.

The polyolefin-elastomer composition used for preparing the polymer composition (ii) can have an elongation at break of at least 1000%, further preferred at least 1100%, most preferably about 1200%, as measured by ASTMD638.

The polyolefin-elastomer can have a value of ShoreD hardness of less than 20, as measured by ASTM D2240 (compression molded sample).

The polymer composition can be applied to component (i) by hot-melt extrusion at a temperature in the range from 100° C. up to 175° C., in a preferred embodiment of the invention in a range from 100° C. to 170° C.

The coupling agent composition can be a mixture of vinyltriethoxysilane (Dynasilan® VTEO of Evonik) and 1,1-di(tert-butylperoxy)-3,3,5-trimethylcyclohexane (Trigonox 29-C50 of AkzoNobel).

The antioxidant can be a phenolic antioxidant, preferably tetrakis[methylene-3-(3,5-di-tert-butyl-4-hydroxyphenyl) propionate] methane (e.g., Irganox 1010 of BASF).

The conjunction device can comprise from, e.g., 1 to 8 elements, each preferably having a diameter of up to 4.0 mm, such as diameters from 0.5 to 4.0 mm, and preferably having from 2 to 5 elements. Preferably, the elements are elongated and/or stranded. The static/moving current medium or communication medium of the elongated elements is preferably surrounded by a polymer composition. The static/moving current media or communication media can be wires, such as copper wires, and can optionally be surrounded by an insulation/polymer composition, e.g. the same polymer composition as component (ii). The cross-section of each element without insulation, i.e. the cross-section of each of the static/moving current medium or communication medium, can for example be from 0.5 to 4.0 mm$^2$. The elements, comprising the static/moving current medium or communication medium which are surrounded by a polymer composition, are brought in contact with and the polymer composition (ii) is then applied to the elements in an extrusion process. Preferably, the outer diameter of the conjunction device is 6.2 mm or more, preferably about 8.2 mm or more, such as 7.5-9.0 mm. Preferably, the conjunction device has a diameter so that it can include 3 elements, each comprising a static/moving current medium or communication medium, e.g. an electrical conductor, which is surrounded by a polymer composition and each having a cross-section, including the polymer composition, of 0.75 mm$^2$ or more, preferably about 1.5 mm$^2$, e.g. a diameter of about 6 mm or more for all 3 elements together.

In one embodiment, the polymer composition does not contain a plasticizer.

The polymer composition preferably does not contain a high density polyethylene homopolymer having a density of 0.94 g/cm$^3$ or higher, preferably not containing a high density polyethylene homopolymer having a density of 0.92 g/cm$^3$ or higher.

The polymer composition preferably does not contain a polysiloxane. The polymer composition preferably does not contain a maleic anhydride grafted polymer.

The polymer composition surrounds the elements to provide insulation for mechanical protection of the elements as well as protection of people from contact with electrical current. The polymer composition surrounding elements is preferably provided in the form of a sheath. For example, the polymer composition coating the elements has a tubular shape.

The glass transition temperature of the polyolefin-elastomer/ultra-low density random ethylene-octene copolymer is preferably −58° C. In one embodiment, the density of the polyolefin-elastomer/ultra-low density random ethylene-octene copolymer is in the range from 0.80 g/cm$^3$ to 0.90 g/cm$^3$, as measured according to ISO 1183.

The polymer composition is preferably not UV cross-linked.

In one embodiment, the conjunction device has an MFI of at least 9 g/10 min, as measured according to EN ISO 1133 under the conditions at 150° C. and the load of 21.6 kg.

The invention also refers to a polymer composition obtainable or obtained by compounding at least the components (a) to (c) as described above. Further details of the polymer composition are also disclosed herein.

In one embodiment, the polymer composition has a ShoreD hardness of 32-38, in particular 36, as measured by ASTM D2240 (compression molded sample) The aforementioned properties can, e.g., be determined by using the polymer composition in the form of a hollow cable with removed conductors and tested according to EN 50363-8.

The process for preparing a conjunction device as disclosed herein may comprise the steps of:

(i) providing one or more elements including a static/moving current medium or communication medium;

(ii) compounding the components of the polymeric composition and then extrusion of the polymeric composition as described herein onto the one or more elements; and (iii) obtaining said conjunction device.

The step of compounding and extrusion is performed in two steps and in different devices: (iia) a compounding step, e.g. in a mixer, and afterwards (iib) the extrusion step in an extruder.

EXAMPLES

The following examples describe the present invention in detail, but are not to be construed to be in any way limiting for the present invention.

VLDPE1 (Clearflex MQF0 of eni/versalis): Is a linear very low density polyethylene (VLDPE) having a density in the range from 0.85 g/cm$^3$ to 0.93 g/cm$^3$, as measured according to ISO 1183, and having a melting point of above 110° C. It has a melt flow index of 8-15 as determined according to ASTM1238 (190° C./2.16 kg; g/10').

VLDPE2 (Clearflex CLD0 of Polimeri Europa, Eni): Is a linear very low density polyethylene (VLDPE) having a density in the range from 0.85 g/cm$^3$ to 0.93 g/cm$^3$, as measured according to ISO 1183, and having a melting point of above 110° C. It has a melt flow index of 2-5 as determined according to ASTM1238 (190° C./2.16 kg; g/10 min).

POE1 (Engage 8842, random octene copolymer): Is an ultra-low density random ethylene-octene copolymer having a glass transition temperature of below −50° C. and having a melting point of below 40° C.

POE2 (Exact8203 of ExxonMobil, block octene copolymer): Is an ultra-low density random ethylene-octene copolymer having a glass transition temperature of below −50° C. and having a melting point of below 40° C. The polymer has an MFI of 3.0 g/10 min, a density of 0.888 g/ccm, a melting point of 72° C., a glass transition temperature of <−75° C. and a Vicat softening point of 51° C.

POE3 (Engage HM7487 of the Dow Chemical Company, random octene copolymer): Is an ultra-low density random ethylene-octene copolymer having a glass transition temperature of below −50° C. and having a melting point of below 40° C. The polymer has an MFI of <0.5 g/10 min, a density of 0.862 g/ccm, a melting point of 37° C., a and a glass transition temperature of <−57° C.

The test method and sample preparation for the measurement of the elongation is performed as with a sheathing material described in EN 50363-8, wherein the conjunction device without the one or more elements is subjected to the measurement.

The compositions in the examples were extruded into cables using a HFFR extruder, with HFFR extrusion head and HFFR screw, at a temperature in the range from 100° C. up to 175° C. The process conditions can be chosen by a person skilled in the art.

Example-1

Composition 1

Composition 1 is characterized by a combination of a VLDPE (VLDPE1), in an amount of 25 wt.-% and a block octene copolymer (POE2) in an amount of 10 wt.-%. At a high filler level of ATH (aluminum hydroxide) of 63%, the elongation was below 300%.

| Composition 1 | | |
|---|---|---|
| 25 | % | VLDPE1 |
| 10 | % | POE2 |
| 63 | % | ATH |
| 1 | % | Antioxidant |
| 1 | % | Coupling agent |

The measured elongation was <300%. Composition 1 passed the alternate bending test, EN 50396.

Example-2

Composition 2

Composition 2 is characterized by a combination of two VLDPEs, i.e., VLDPE1 and VLDPE2, in a total amount of 32 wt.-%. The two VLDPEs are used in combination with a block octene copolymer (POE2). An additional low level of ATH (aluminum hydroxide) of 58% gives a high elongation.

| Composition 2 | | |
|---|---|---|
| 24 | % | VLDPE1 |
| 8 | % | VLDPE2 |
| 8 | % | POE2 |
| 58 | % | ATH |
| 1 | % | Antioxidant |
| 1 | % | Coupling agent |

The measured elongation was >300%. Reducing the ATH level from 63% to 58% reduces the flame retardancy.

Example-3

Composition 3

Composition 3 is characterized by a combination of two VLDPEs, i.e., VLDPE1 and VLDPE2, in a total amount of 32 wt.-%. The two VLDPEs are used in combination with a random octene copolymer (POE3). Even at a high filler level of ATH (aluminum hydroxide) of 58%, a very high elongation was obtained.

| Composition 3 | | |
|---|---|---|
| 24 | % | VLDPE1 |
| 8 | % | VLDPE2 |
| 8 | % | POE3 |
| 58 | % | ATH |
| 1 | % | Antioxidant |
| 1 | % | Coupling agent |

The measured elongation was >400%. A comparison between Compositions 2 and 3 seems to confirm the concept underlying the present invention. That is, the specific combination and amounts of components provides the desired elongation.

Example-4

Composition 4 (Comparative Example)

Composition 4 is characterized by a combination of two VLDPEs, i.e., VLDPE1 and VLDPE2, in a total amount of 32 wt.-%. The two VLDPEs are used in combination with a propylene-based elastomer.

| Composition 4 | | |
|---|---|---|
| 24 | % | VLDPE1 |
| 8 | % | VLDPE2 |
| 8 | % | Propylene-based elastomer (copolymer) |
| 58 | % | ATH |
| 1 | % | Antioxidant |
| 1 | % | Coupling agent |

The measured elongation was <300%. The measured tensile strength was <7.5 MPa. A comparison between Compositions 3 and 4 seems to suggest that the use of a propylene-based elastomer does not provide a very high elongation.

Example-5

Composition 5 (Comparative Example)

Composition 5 is characterized by a combination of EVA (ethylene vinyl acetate) in an amount of 16 wt.-%. The EVA is used in combination with a block octene copolymer (POE2).

| Composition 5 | | |
|---|---|---|
| 16 | % | EVA |
| 15 | % | POE2 |
| 63 | % | ATH |
| 1 | % | Antioxidant |
| 5 | % | Coupling agent MAH-PE |

The measured elongation was <300%. The composition failed the hot pressure test (80° C.>50%). A comparison between the above compositions seems to suggest that the use of EVA does not provide a very high elongation and dimensional stability. Additionally, another coupling agent does not improve the properties.

Example-6

Composition 6 (Comparative Example)

Composition 6 is characterized by a combination of two VLDPEs, i.e., VLDPE1 and VLDPE2, in a total amount of 28 wt.-%. The two VLDPEs are used in combination with an α-olefin copolymer.

| Composition 6 | | |
|---|---|---|
| 21 | % | VLDPE1 |
| 7 | % | VLDPE2 |
| 7 | % | α-olefin copolymer (Vestoplast 750) |
| 63 | % | ATH |
| 1 | % | Antioxidant |
| 1 | % | Coupling agent |

The measured elongation was <300%. A comparison between the above compositions seems to suggest that the use of a random ethylene-octene copolymer is superior to the use of an α-olefin copolymer regarding elongation at break.

Composition 7 (Comparative Example)

Composition 7 is characterized by a combination of two VLDPEs, i.e., VLDPE1 and VLDPE2, in a total amount of 20 wt.-%. The two VLDPEs are used in combination with an amorphous propylene-ethylene copolymer and POE2.

| Composition 7 | | |
|---|---|---|
| 16 | % | VLDPE1 |
| 4 | % | VLDPE2 |
| 10 | % | POE2 |
| 5 | % | Amorphous propylene-ethylene copolymer, Eastoflex 1060PL |
| 63 | % | ATH |
| 1 | % | Antioxidant |
| 1 | % | Coupling agent |

The measured elongation was >300%. The composition failed the hot pressure test (hot pressure test 80° C.>50%). The experiment seems to show how changing the polymer compositions results in deterioration of the properties.

Composition 8

Composition 8 is characterized by a combination of two VLDPEs, i.e., VLDPE1 and VLDPE2, in a total amount of 18 wt.-%. The two VLDPEs are used in combination with a random octene copolymer (POE3) in an amount of 17%.

| Composition 8 | | |
|---|---|---|
| 14 | % | VLDPE1 |
| 4 | % | VLDPE2 |
| 17 | % | POE3 |
| 63 | % | ATH |
| 1 | % | Antioxidant |
| 1 | % | Coupling agent |

The measured elongation was >400%. The composition failed the hot pressure test (80° C.>50%). The example seems to suggest that the amount of POE was too high for mechanical stability at high temperatures but good for elongation at break at room temperature.

Composition 9

Composition 9 is characterized by a combination of two VLDPEs, i.e., VLDPE1 and VLDPE2, in a total amount of 23 wt.-%. The two VLDPEs are used in combination with a random octene copolymer in an amount of 13%.

| Composition 9 | | |
|---|---|---|
| 20 | % | VLDPE1 |
| 3 | % | VLDPE2 |
| 13 | % | POE1 |
| 62 | % | ATH |
| 1 | % | Antioxidant |
| 1 | % | Coupling agent |

The measured elongation was >400%. The flexibility test was achieved with a test conjunction device.

Composition 10

Composition 10 is characterized by a combination of two VLDPEs, i.e., VLDPE1 and VLDPE2, in a total amount of 30 wt.-%. The two VLDPEs are used in combination with a random octene copolymer (POE1) in an amount of 10%.

| Composition 10 | | |
|---|---|---|
| 20 | % | VLDPE1 |
| 10 | % | VLDPE2 |
| 10 | % | POE1 |
| 58 | % | ATH |
| 1 | % | Antioxidant |
| 1 | % | Coupling agent |

The measured elongation was >430%. With this formulation, the flexibility test can be achieved with a conjunction device with three inner elements, each having a cross-section of 1.5 mm$^2$.

CITED LITERATURE

EP1102282 A1
DE3633056 A1
WO 2010015876 A1
WO 2013030795 A1
WO 2002026879 A1
WO 2007032573 A1
WO 2008014597 A1 and
WO 2010024602 A2

The invention claimed is:

1. Conjunction device comprising:
   (i) one or more elements including a static/moving current medium or communication medium; and
   (ii) a halogen-free polymer composition surrounding the element(s), wherein said polymer composition is obtainable or obtained by compounding and extrusion of at least the following components:
      (a) 24-32 wt.-% of a linear very low density polyethylene (VLDPE) composition having a density in the range from 0.85 g/cm$^3$ to 0.93 g/cm$^3$, as measured according to ISO 1183, and having a melting point of above 110° C., as determined by differential scanning calorimetry and wherein the linear very low density polyethylene composition comprises a mixture of two different types of linear very low density polyethylene compositions, which is a mixture of 20-26 wt.-% of a first composition having a density in the range from 0.85 g/cm$^3$ to 0.95 g/cm$^3$, as measured according to ISO 1183, and 1-7 wt.-% of a second composition having a density in the range from 0.85 g/cm$^3$ to 0.95 g/cm$^3$, as measured according to ISO 1183;
      (b) 8-16 wt.-% of one or more polyolefin-elastomers, wherein the polyolefin-elastomer(s) is/are ultra-low density random ethylene-octene copolymer(s) having
         a glass transition temperature of below −50° C., as determined by differential scanning calorimetry, and
         a melting point of below 40° C., as determined by differential scanning calorimetry; and
      (c) 55-65 wt.-% of a flame retardant filler, which is a hydrated metal-based filler.

2. The conjunction device according to claim 1, wherein the polymer composition further comprises:
   (d) 0.1-3.0 wt.-% of an antioxidant; and
   (e) 0.5-2.5 wt.-% of a coupling agent composition.

3. The conjunction device according to claim 1, wherein the polymer composition has an elongation at break in the range from 300% to 500%, as measured by IEC 60811-501 using the conjunction device without the one or more elements.

4. The conjunction device according to claim 1, wherein the linear very low density polyethylene composition has a density in the range from 0.85 g/cm$^3$ to 0.92 g/cm$^3$, as measured according to ISO 1183.

5. The conjunction device according to claim 1, wherein the polyolefin-elastomer has a density in the range from 0.80 g/cm$^3$ to 0.90 g/cm$^3$, as measured according to ASTM D792.

6. The conjunction device according to claim 1, wherein the polyolefin-elastomer has a value of ShoreD hardness of less than 20, as measured by ASTM D2240.

7. The conjunction device according to claim 1, wherein the polymer composition is applied by a hot-melt extrusion at a temperature in the range from 100-170° C.

8. The conjunction device according to claim 1, wherein the flame retardant filler is aluminum hydroxide or magnesium hydroxide.

9. The conjunction device according to claim 1 having an outer diameter of 7.5-9.0 mm.

10. The conjunction device according to claim 1, wherein the polymer composition does not contain a plasticizer.

11. The conjunction device according to claim 1, wherein the polymer composition does not contain a high density polyethylene homopolymer having a density of 0.94 g/cm$^3$ or higher.

12. The conjunction device according to claim 1, wherein the polymer composition surrounds the elements to provide a sheath for mechanical protection of the elements.

13. Polymer composition obtainable or obtained by compounding and extrusion of at least components (a), (b) and (c) as defined in claim 1.

14. The polymer composition of claim 13, which is further characterized as in claim 3.

15. The conjunction device according to claim 1, wherein the polymer composition has a strength at break in the range from 7.5 MPa to 15.0 MPa, as measured by IEC 60811-501 using the conjunction device without the one or more elements.

16. The conjunction device according to claim 1, wherein the flame retardant filler is fine precipitated aluminum hydroxide of about 99.4% purity.

17. The conjunction device according to claim 1 having an outer diameter of 7.5-9.0 mm, which passes the alternate bending test according to EN 50396 with 30,000 cycles.

* * * * *

UNITED STATES PATENT AND TRADEMARK OFFICE
CERTIFICATE OF CORRECTION

Page 1 of 1

PATENT NO. : 11,248,111 B2
APPLICATION NO. : 16/330622
DATED : February 15, 2022
INVENTOR(S) : Delineau et al.

It is certified that error appears in the above-identified patent and that said Letters Patent is hereby corrected as shown below:

On the Title Page

Column 1, Item (86) PCT No.: delete "PCT/US2016/071355" and insert --PCT/EP2016/071355--.

In the Specification

Column 1, Line 10 delete "PCT/US2016/071355" and insert --PCT/EP2016/071355--.

Signed and Sealed this
Twentieth Day of September, 2022

Katherine Kelly Vidal
*Director of the United States Patent and Trademark Office*